US009321061B2

(12) United States Patent
Kleineidam et al.

(10) Patent No.: US 9,321,061 B2
(45) Date of Patent: Apr. 26, 2016

(54) POWDER SUPPLY SYSTEM AND METHOD FOR COLOUR CHANGE IN A POWDER SUPPLY SYSTEM

(75) Inventors: Andreas Kleineidam, Elmshorn (DE); Michael Phillips, Wolverhampton (GB); Antonius Petras Maria De Veer, Oss (NL); Jens Kollosche, Kormagen (DE)

(73) Assignee: NORDSON CORPORATION, Westlake, OH (US)

( * ) Notice: Subject to any disclaimer, the term of this patent is extended or adjusted under 35 U.S.C. 154(b) by 299 days.

(21) Appl. No.: 13/639,667

(22) PCT Filed: Apr. 11, 2011

(86) PCT No.: PCT/EP2011/055613
§ 371 (c)(1),
(2), (4) Date: Oct. 5, 2012

(87) PCT Pub. No.: WO2011/128288
PCT Pub. Date: Oct. 20, 2011

(65) Prior Publication Data

US 2013/0019970 A1 Jan. 24, 2013

(30) Foreign Application Priority Data

Apr. 12, 2010 (EP) .................................... 10003860

(51) Int. Cl.
*B65G 53/52* (2006.01)
*B05B 7/14* (2006.01)
*B05B 12/14* (2006.01)

(52) U.S. Cl.
CPC ............... *B05B 7/1445* (2013.01); *B05B 7/144* (2013.01); *B05B 7/1472* (2013.01); *B05B 12/14* (2013.01); *B05B 7/1486* (2013.01); *B05B 12/1463* (2013.01); *Y10T 137/0318* (2015.04); *Y10T 137/85978* (2015.04)

(58) Field of Classification Search
USPC .............. 406/92, 136, 151, 154; 118/50, 300; 239/143, 654
See application file for complete search history.

(56) References Cited

U.S. PATENT DOCUMENTS

| | | | | |
|---|---|---|---|---|
| 1,778,100 A * | 10/1930 | Webb | .......................... | 406/137 |
| 3,179,378 A * | 4/1965 | Zenz et al. | .................... | 366/106 |
| 3,451,724 A * | 6/1969 | Cappelli et al. | ............... | 406/137 |
| 3,733,030 A * | 5/1973 | Carstenson | ................... | 239/205 |
| 3,869,843 A * | 3/1975 | Darrah et al. | .................. | 53/448 |

(Continued)

FOREIGN PATENT DOCUMENTS

EP 0 528 613 2/1993

OTHER PUBLICATIONS

International Search Report for International Patent Application No. PCT/EP2011/055613 dated May 25, 2011.

(Continued)

*Primary Examiner* — Joseph Dillon, Jr.
(74) *Attorney, Agent, or Firm* — Baker & Hostetler LLP

(57) ABSTRACT

The invention relates to a Powder supply system for supplying powder to a powder spray device comprising a powder supply hopper; a powder fluidizing device for fluidizing powder positioned in the powder supply hopper; a powder pump for conveying powder from the powder supply hopper to the spray device. According to the invention the powder supply hopper is pivotally mounted to a support structure. The invention further relates to a method for color change in a powder supply system.

4 Claims, 9 Drawing Sheets

(56) References Cited

U.S. PATENT DOCUMENTS

Figure 1:
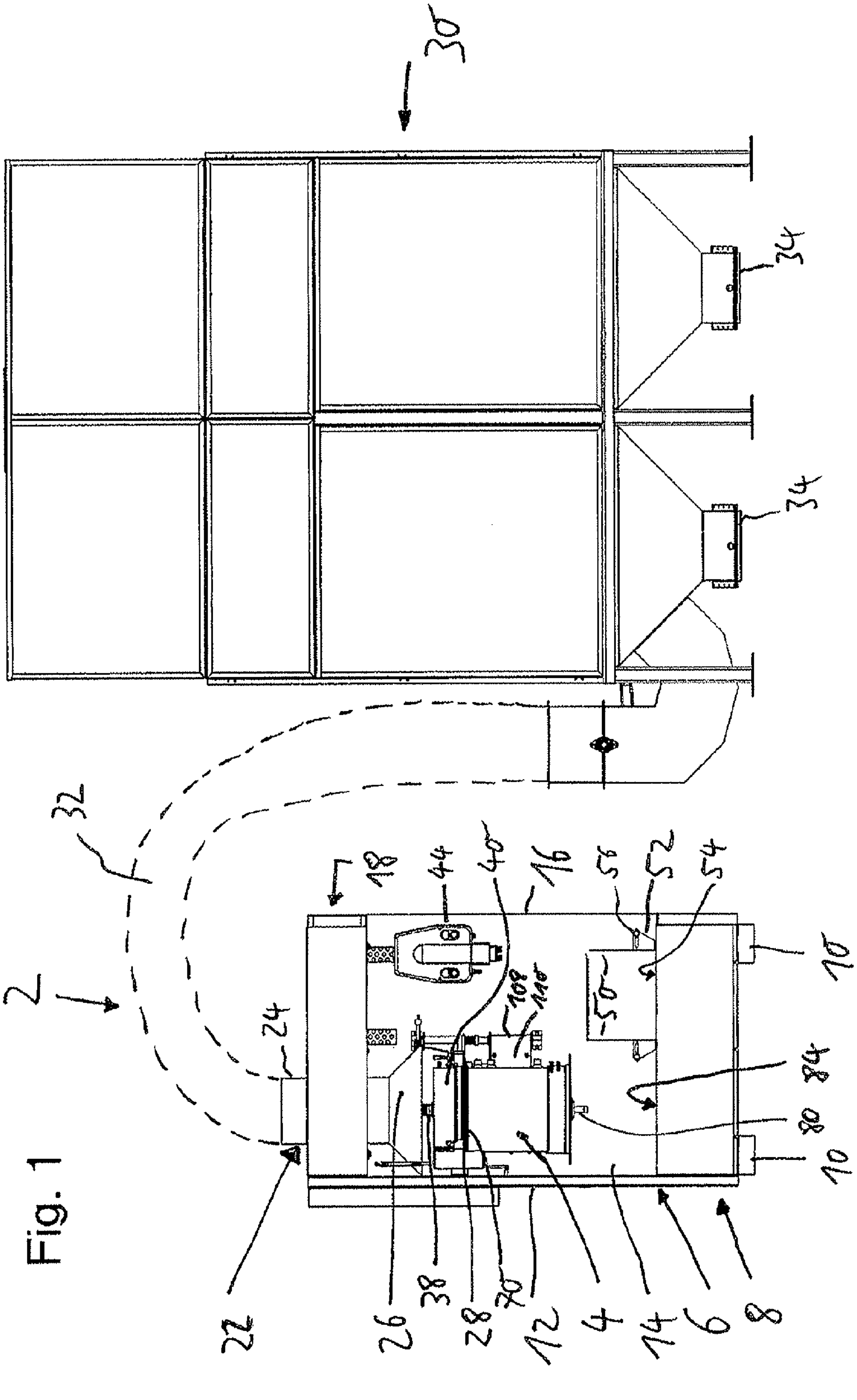

| | | | | | |
|---|---|---|---|---|---|
| 4,381,898 | A | | 5/1983 | Rotolico et al. | |
| 4,508,148 | A | * | 4/1985 | Trechsel et al. | 141/147 |
| 4,522,102 | A | * | 6/1985 | Pickens | 86/27 |
| 4,676,286 | A | * | 6/1987 | Aiuola et al. | 141/145 |
| 4,740,112 | A | | 4/1988 | Muehlberger et al. | |
| 4,808,042 | A | * | 2/1989 | Muehlberger et al. | 406/66 |
| 5,018,909 | A | * | 5/1991 | Crum et al. | 406/138 |
| 5,103,524 | A | * | 4/1992 | Vowles | 15/3.51 |
| 5,213,271 | A | * | 5/1993 | Uribe et al. | 239/654 |
| 5,690,283 | A | * | 11/1997 | Sandolo | 241/34 |
| 6,257,804 | B1 | * | 7/2001 | Gathmann | 406/68 |
| 7,121,062 | B2 | * | 10/2006 | Till | 53/167 |
| 8,827,190 | B2 | * | 9/2014 | Redman | 239/654 |
| 2005/0115496 | A1 | * | 6/2005 | Shutic et al. | 118/308 |
| 2005/0241725 | A1 | * | 11/2005 | Popplau | 141/98 |
| 2006/0137315 | A1 | * | 6/2006 | Shutic et al. | 55/459.1 |
| 2014/0174302 | A1 | * | 6/2014 | Seto et al. | 99/607 |

OTHER PUBLICATIONS

Written Opinion for International Patent Application No. PCT/EP2011/055613 dated May 25, 2011.

International Preliminary Report on Patentability dated Oct. 16, 2013, for International Patent Application No. PCT/EP2011/055613.

Examination Report dated Sep. 24, 2013, for corresponding European Patent Application Serial No. 10003860.3.

Office Action for Chinese Application No. 201180018844.3 dated Nov. 28, 2014.

Office Action for Chinese Application No. 201140018844.3 dated Jul. 14, 2015.

* cited by examiner

POWDER SUPPLY SYSTEM AND METHOD FOR COLOUR CHANGE IN A POWDER SUPPLY SYSTEM

The invention relates to a powder supply system for powder coating installations, in particular for high performance quick-change powder supply systems. The invention further relates to a method for quick colour change in powder supply systems for powder coating spray systems.

Powder spray coating systems and installations including powder spray devices are commonly used to powder coat various products such as for example metal, wood or plastic products, including furnished automotive products, machine parts, vehicles and the like.

Powder supply systems for such powder installations are used for fluidizing powder stored and delivered in a container or box and for supplying the fluidized powder to powder spray devices such as powder spray guns or the like.

In typical high-performance industrial powder coating installations, a number of powder spray devices or groups thereof can be supplied by a common powder supply system, often referred to as a so-called powder feed centre.

Such powder feed centre does typically comprise a powder supply hopper which is used to supply the powder to this spray device. The powder in the hopper is fluidized by means of a powder fluidizing device associated with the hopper. A powder pump conveys powder from the hopper to the spray device.

When a colour change is desired, an operator is required to initiate a purging procedure in order to purge the hopper and powder supply lines of the system including for example powder supply lines connecting the hopper and the spray devices. It is a general desire to perform the cleaning and other handling operation during a powder change as quickly, reliably and completely as possible.

It has been suggested that hoses extending between a spray gun and hopper are removably connected.

U.S. Pat. No. 6,695,220 discloses a powder spray system having a plurality of supply hoppers. Each hopper is supported on wheels, to move the hopper on the floor. Hoses are removably connected to a purge air supply.

U.S. Pat. No. 6,852,164 discloses a powder supply system having a powder storage container or hopper which is supported by a lifting table. With the help of a lifting device, the lifting table can be raised to an operating position.

It is an object of the invention to provide a powder supply system which permits easy and quick cleaning, in particular in the case of a colour change.

Further, it is an object of the invention to provide a method for quick color change in a powder supply and a powder spray system.

In accordance with the first aspect of the invention, a powder supply system for supplying powder is provided comprising a powder supply hopper; a powder fluidizing device for fluidizing powder positioned in the powder supply hopper; a powder pump for conveying powder from the powder supply hopper to the spray device; characterized in that the powder supply hopper is pivotally mounted to a support structure.

A powder supply hopper, which, according to the invention, is pivotably mounted to a support structure, in particular a support structure which is part of the powder supply system, allows a quick colour change. The powder supply hopper can be moved easily between different operating positions within the system. For example, in one position, the hopper can be pivoted towards a powder container which comprises virgin powder, so that virgin powder can easily be pumped into the hopper. The hopper can be pivoted into a second position for a colour change, in which the hopper can be positioned with respect to the powder container, in particular above the powder container to empty the hopper. By means of the pivot mounting, the hopper can easily be handled.

In an advantageous embodiment, the support structure comprises a powder container base for placing a powder container, and the powder supply hopper is pivotally mounted to the support structure between a first position and a second emptying position substantially above the powder container base. For the emptying operation, a powder container can be positioned on the powder container base, so that the hopper would be pivoted out over the container of the appropriate colour of powder coating material, and the powder in the hopper would be dumped through a powder dumped outlet of the hopper into the container. The hopper could be cleaned subsequently.

In accordance with a second aspect of the invention, a powder supply system for supplying powder to a powder spray device is provided, comprising a powder supply hopper; a powder fluidizing device for fluidizing powder positioned in the powder supply hopper; a powder pump for conveying powder from the powder supply hopper to the spray device; characterized in that powder supply hopper comprises a lid which is movably mounted to a support structure.

One significant advantage of a hopper having an opening which can be closed by a moveable lid is that the hopper can very quickly and easily be opened and closed. Preferably, the hopper comprises a top opening which can be closed by the lid during the supply operation and which can be opened for cleaning the hopper. In particular, when a colour change is carried out, the lid can be moved off the top opening of the hopper and the hopper can be cleaned preferably with the aid of pressure gas flowing into the hopper. After the cleaning and colour change operation, the lid is moved back onto the hopper to close the top opening.

In accordance with the preferred embodiment the lid is pivotably mounted to the support structure. A pivot mounted lid can easily be handled between the closed and opened positions. It is an option that the lid is moved manually from the open to the closed position.

In accordance with a preferred embodiment, the pivot axis of the powder supply hopper and the lid is in a vertical orientation, so that no substantial lifting of the lid and/or the hopper is required.

It is further preferred, that the powder supply hopper is attached to at least one support arm and/or that the lid is attached to at least one support arm.

In another advantageous embodiment, the lid is pivotably mounted to the support structure, so that the lid is movable between a first closed position, in which the lid closes a top opening of the powder supply hopper, to a second open position.

Furthermore, it is preferred that the lid is pivotably mounted to the support structure by means of a pivoting and lifting mechanism which is adapted to allow the lid to be pivoted from the first open position into the second closed position and lower the lid towards the powder supply hopper, to close the top opening, and to lift the lid upwardly from the powder supply hopper, to open the top opening. In such a lifting and pivoting movement, the hopper can easily be opened for a cleaning operation and easily be closed before the is supply and spraying operation begins.

In another preferred embodiment, the powder supply hopper and the lid are independently moveable, in particular in a pivoting movement. This gives a high flexibility within the powder centre in that the hopper and lid can be moved into the desired and best position during operation or cleaning or maintenance.

In accordance with a third aspect of the invention, a powder supply system is provided for supplying powder to a powder spray device, a powder supply hopper; a powder fluidizing device for fluidizing powder positioned in the powder supply hopper; a powder pump for conveying powder from the powder supply hopper to the spray device; a support structure comprising a powder container base for placing a powder container; characterized in that powder supply hopper is positioned substantially above the powder container base such that powder from the powder supply hopper can be conveyed downwardly into a powder container placed on the powder container base.

In accordance with this aspect, the powder supply hopper which is preferably pivotally mounted to the support structure such as a frame, the hopper can be positioned above the powder container base on which a container can be positioned for emptying the hopper. Due to gravity, the powder will flow out of the hopper into the powder container.

Subsequently, a cleaning operation can be carried out and the hopper can be filed with fresh powder of a different colour.

In accordance with a fifth aspect of the invention, a powder supply system for supplying powder to a powder spray device is provided, comprising a powder supply hopper; a powder fluidizing device for fluidizing powder positioned in the powder supply hopper; a powder pump for conveying powder from the powder supply hopper to the spray device; a support structure; characterized in that a powder suction device is mounted to the support structure and is adapted to remove residual powder which flows out of the powder supply hopper.

By the aid of a powder suction or extraction device which is mounted to the support structure and is preferably part of the powder supply system, the cleaning of the supply system for a colour change is much easier. For a colour change, the hopper would be pivoted over a container so that the powder flows into a container. The hopper would then be positioned with respect to the powder suction device. Compressed air is supplied to the hopper, to blow residual powder out of the hopper. At the same time, powder can be collected by means of the powder suction device which is preferably part of the feed centre.

In accordance with a preferred embodiment, the powder suction device is mounted to a ceiling section of the support structure. The hopper can be cleaned by means of an air flow from the bottom towards the top portion of the hopper so that residual powder is flowing upwardly out of the hopper and can be easily collected within the powder suction device. Residual powder is collected reliably.

In accordance with a preferred embodiment, the powder supply hopper has a top opening, a lid for closing the top opening and at least one further opening which can be connected to a pump for pumping purge gas into the hopper, wherein the powder suction device comprises a collector hood which is positioned substantially above the top opening of the powder supply hopper, such that residual powder, which is sucked out of the top opening of the powder supply hopper, is extracted into the collector hood of the powder suction device.

Furthermore, in another preferred embodiment the powder supply hopper has a top opening, a lid for closing the top opening and at least one further opening which can be connected to a pump for pumping purge gas into the hopper, wherein the at least one further opening is positioned in a tangential orientation at the hopper wall, such that a vortex flow or other purge gas flow is generated within the hopper when purge gas is pumped into the hopper through the opening(s). By means of a tangential orientation of an inlet opening for introducing purged air into the hopper, a vortex or other purge gas flow can be generated within the hopper so that an effective cleaning is achieved.

In accordance with a sixth aspect of the invention, a powder supply system is provided for supplying powder to a powder spray device, comprising a powder supply hopper having a top opening and a lid for closing the opening; a powder fluidizing device for fluidizing powder positioned in the powder supply hopper; a powder pump for conveying powder from the powder supply hopper to the spray device; characterized in that a sieve is mounted to the lid.

One advantage of this aspect of the invention including a sieve which is mounted to the lid of the hopper is that virgin powder material can be filed into the hopper through the lid. The powder is evenly distributed by means of the sieve so that the powder has a good particle size distribution and can easily be fluidized subsequently after the filling operation. The sieve can be easily positioned within the lid. If, in accordance with another preferred embodiment, the lid covers a top opening of the hopper and the top opening is of relatively large size with respect to the hopper size then relatively large amounts of powder can be filed into the hopper through the sieve within short time because the flow cross section is relatively large.

Preferably, the lid comprises a housing and the sieve is positioned within the housing.

In order to further improve the cleaning operation, a vibrator assembly is mounted to the lid for vibrating the lid and/or the sieve. The vibrator assembly could comprise an ultrasonic device.

In accordance with a seventh aspect of the invention, a method for colour change in a powder supply system is provided, the supply system having a powder supply hopper with a top opening and lid, a powder fluidizing device, a powder pump for conveying powder from the powder supply hopper to a spray device and a support structure for supporting the power supply hopper and/or the powder fluidizing device and/or a powder container base for placing a powder container, wherein the method comprises the following steps: placing a first powder container containing powder of a first colour on a powder container base, pumping or filling powder from the first powder container into the powder supply hopper, fluidizing the powder in the powder supply hopper by means of a powder fluidizing device, conveying powder from the powder supply hopper to at least one spray device by means of the powder pump, stopping the conveying operation, positioning the power supply hopper above the powder container positioned on the powder container base, emptying powder from the hopper into the powder container, opening a lid of the powder supply hopper to open a top opening, pumping purge gas into the powder supply hopper through at least one opening by means of a pump, purging the hopper by means of the purged gas so that residual powder flows out of the top opening of the powder supply hopper, extracting powder flowing out of the top opening by means of a powder suction device.

Such a colour change method is very reliable and allows a quick cleaning and colour change. The powder supply system according to the invention allows that the components can be cleaned easily and quickly and at least partly automatically. The cleaning operation and a colour change is considerably simplified. The old powder can be removed easily thanks to the different aspects of the invention and the combination of the above described aspects and features of the preferred embodiments. It is to be understood that parts of the above features and a combination thereof help to solve the object.

Figure 2:
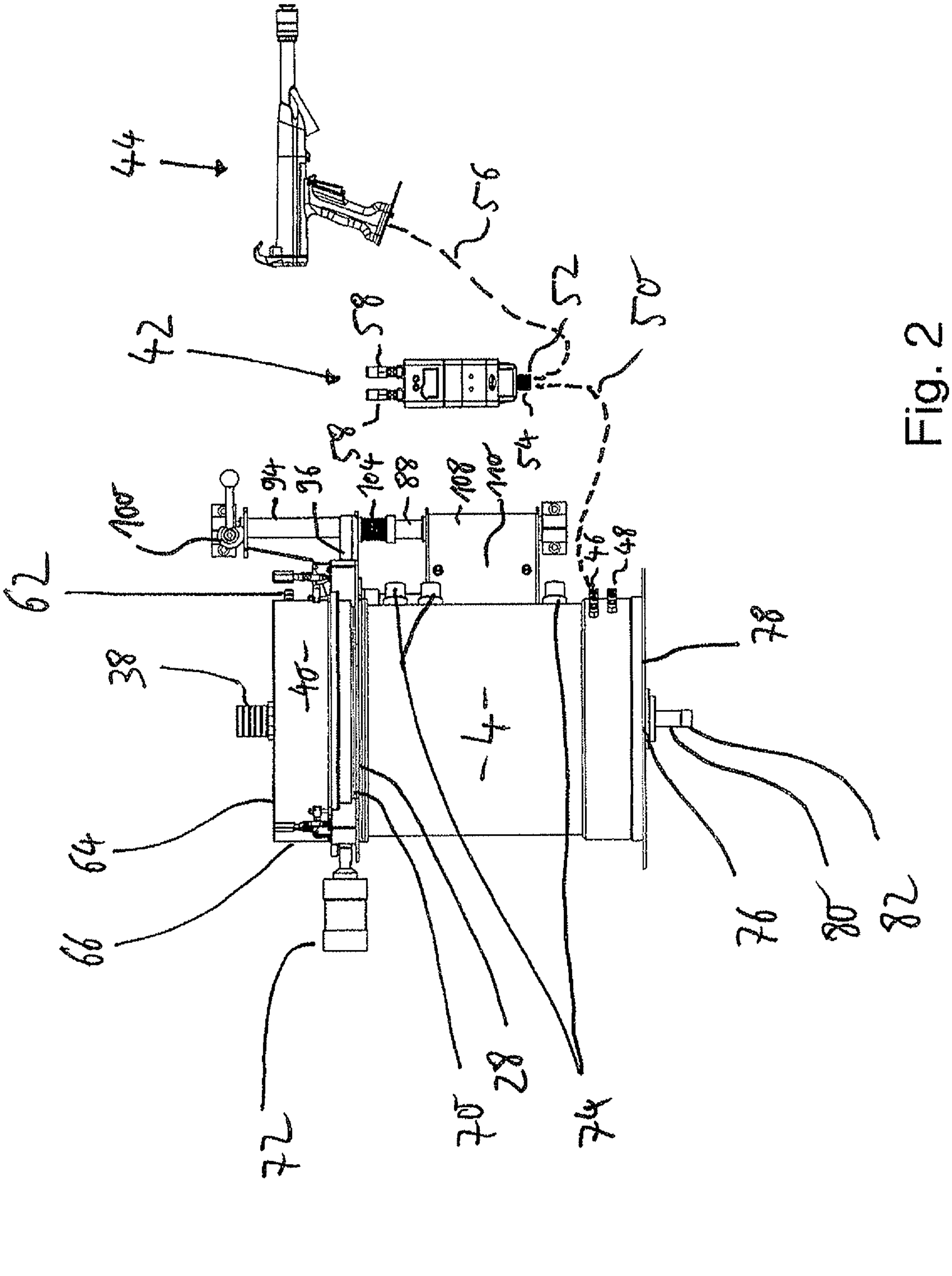
Figure 3:
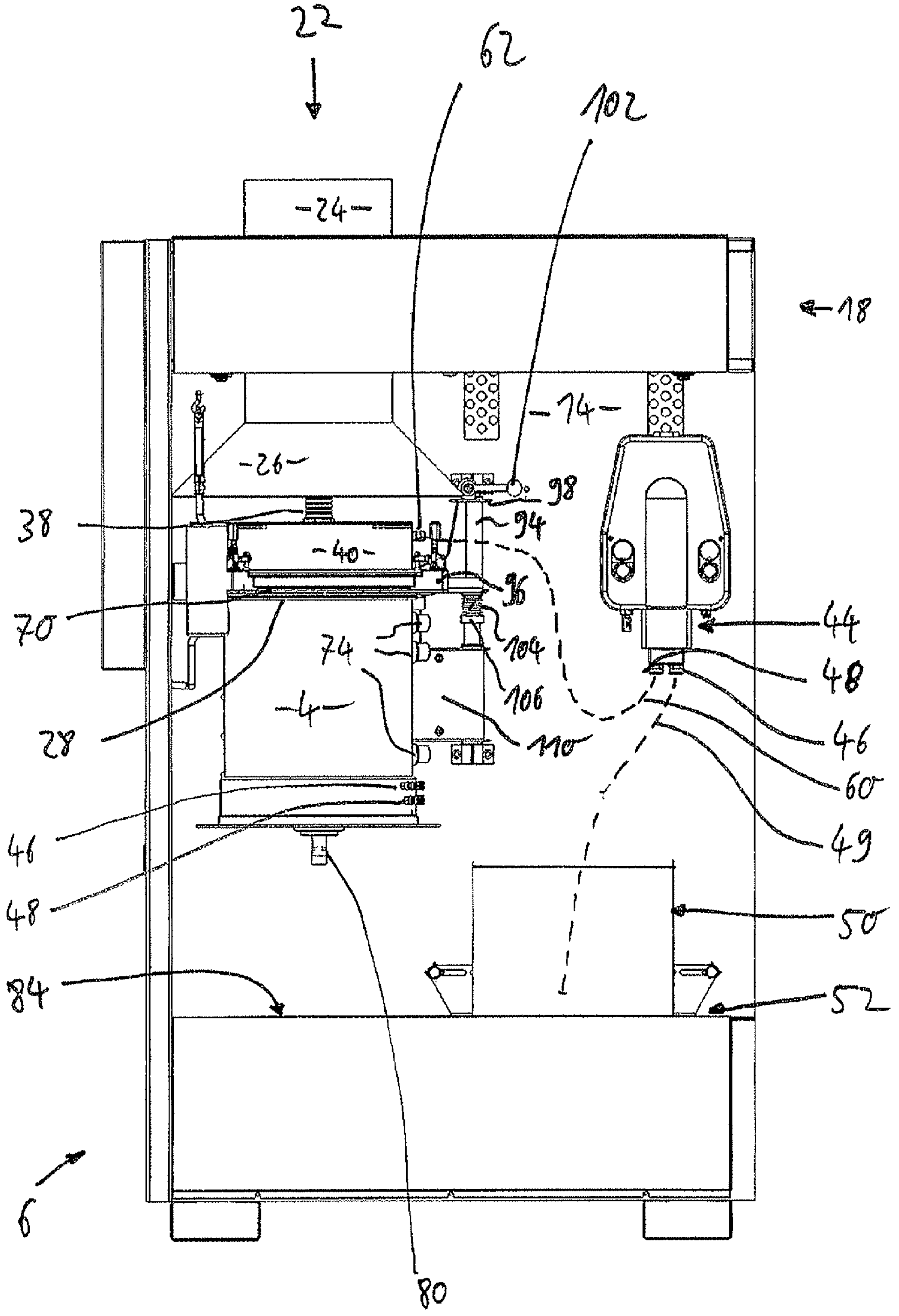

A preferred embodiment of the invention will be described hereinafter with reference to the appended drawings. The features disclosed in the following embodiment can be used independently and in all various combinations in accordance with the invention. Further, features described in the specification and/or shown in the drawings and/or described in the claims may be combined. The drawings show in:

FIG. 1 a powder supply system for supplying powder and an associated powder filter in a side view;

FIG. 2 a powder supply hopper of the powder supply system shown in FIG. 1 and a powder pump and a powder spray device in a side view;

FIG. 3 the powder supply system according to FIG. 1 in an enlarged side view with a powder container (box) placed on a vibration table (supply position)

Figure 4:
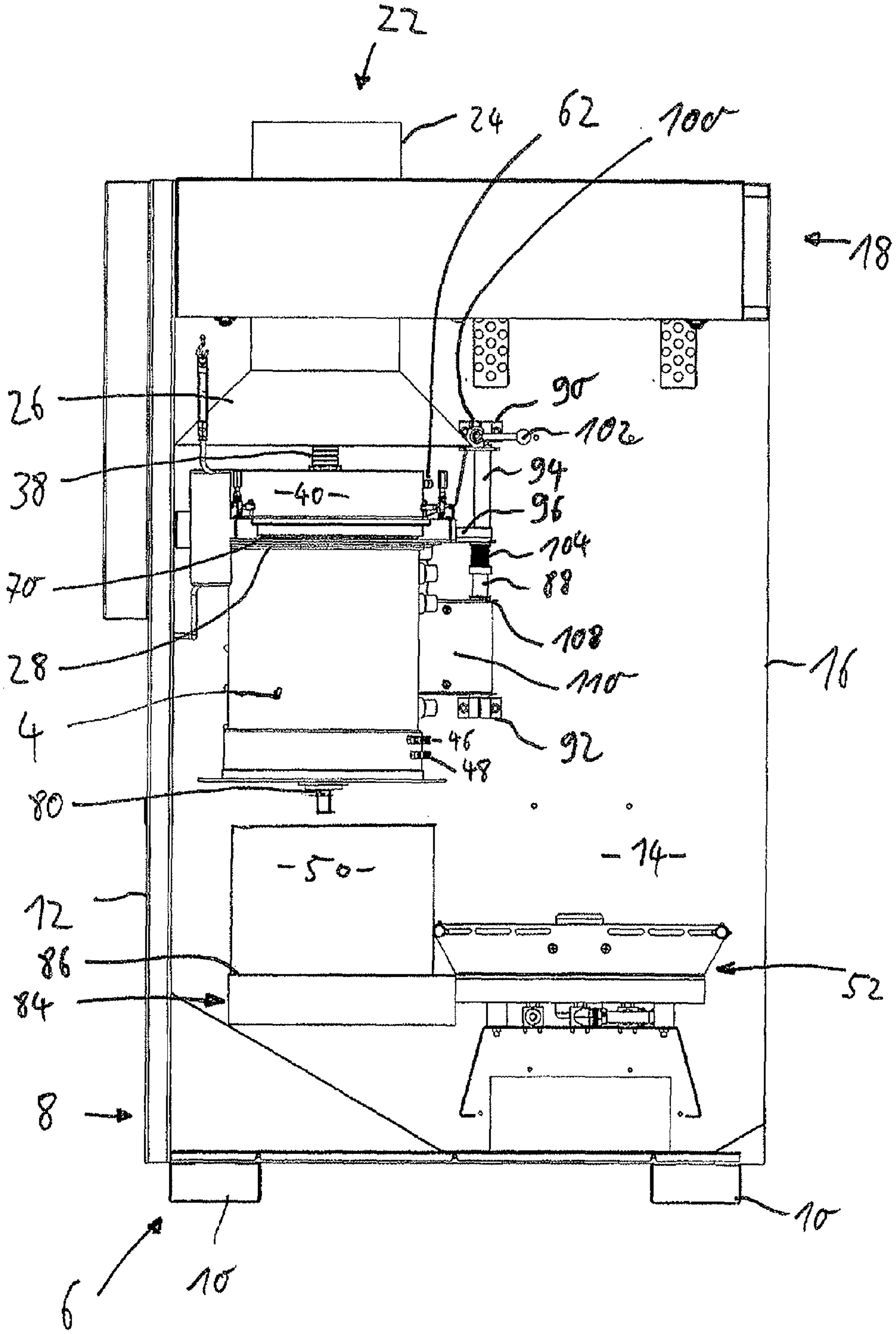
Figure 5:
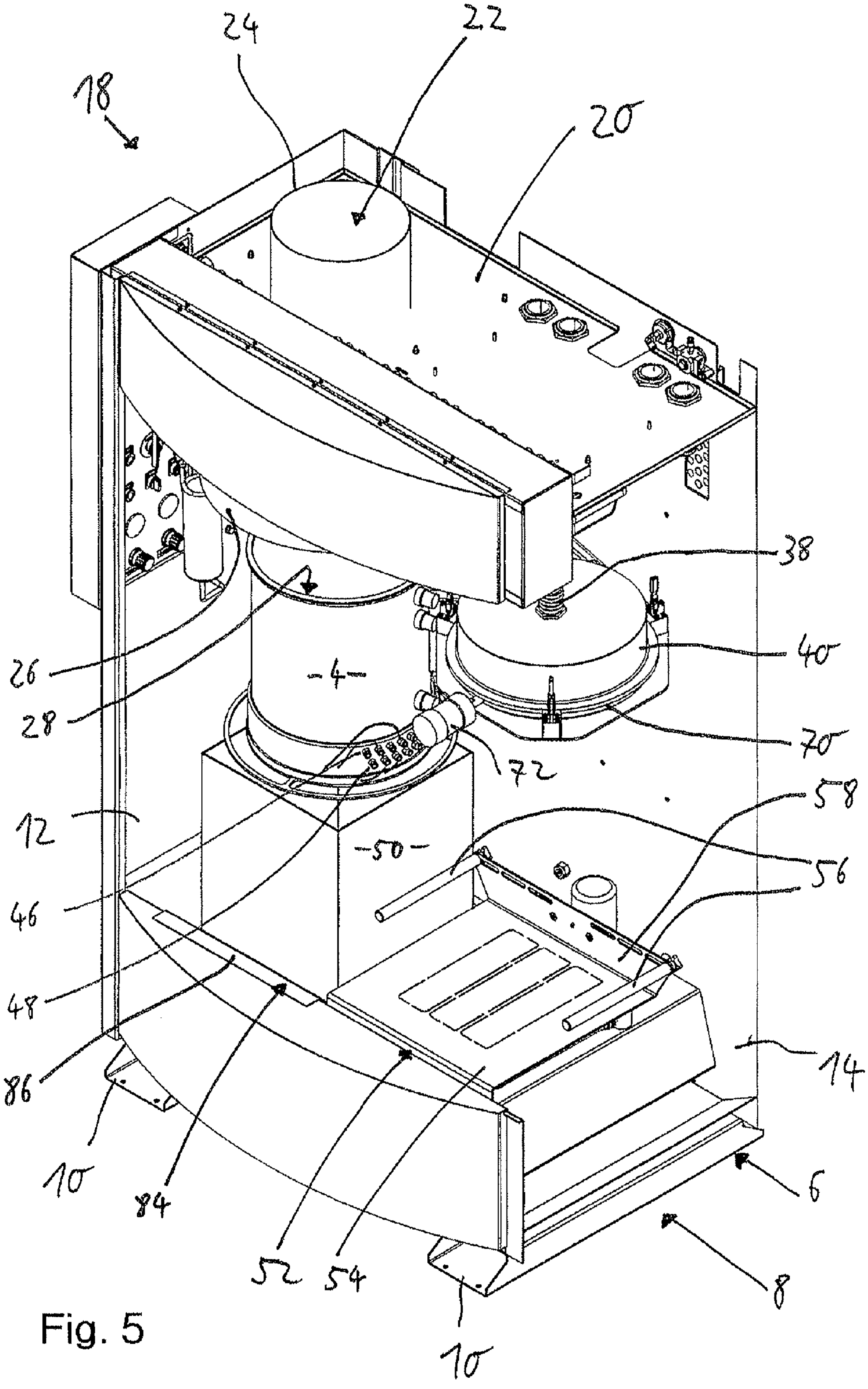
Figure 6:
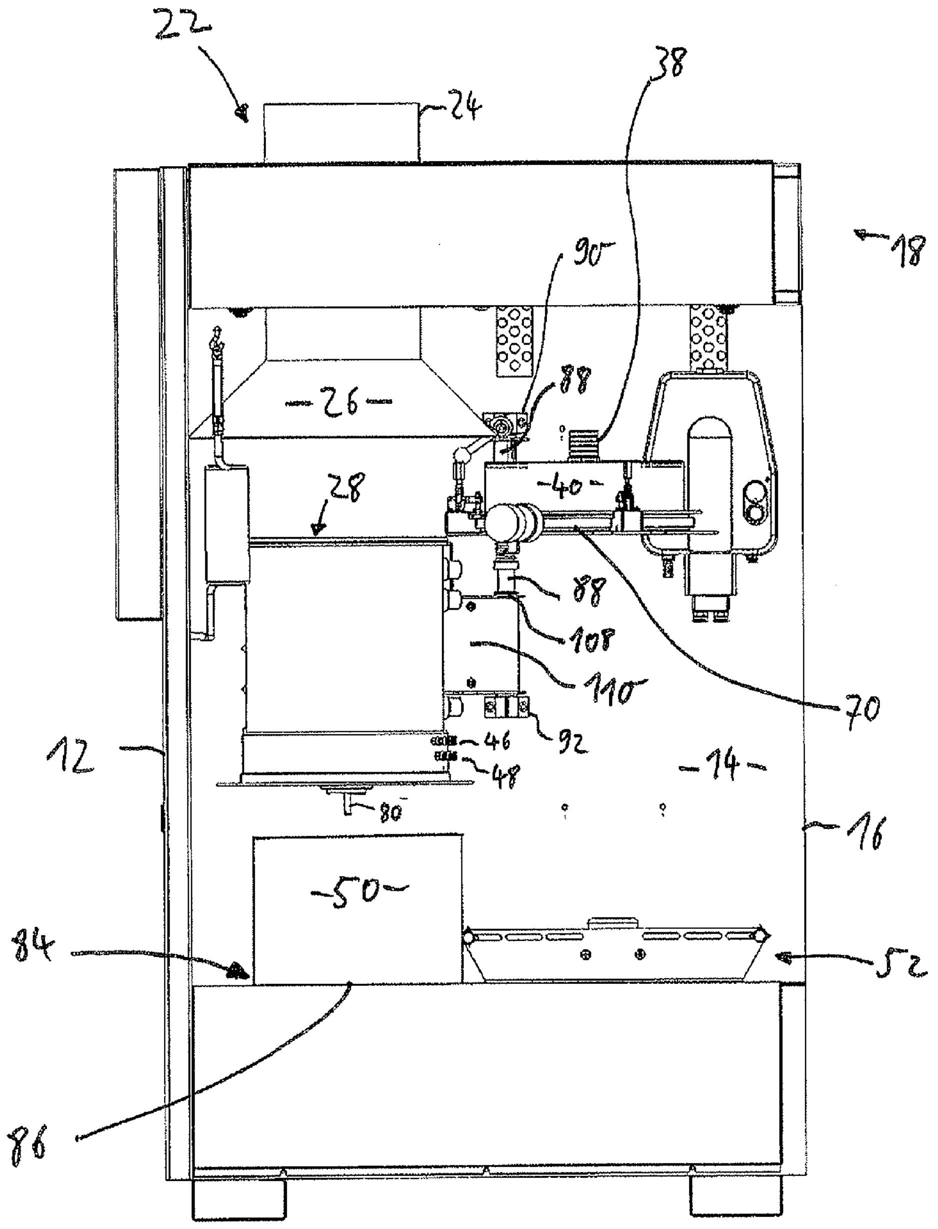
Figure 7:
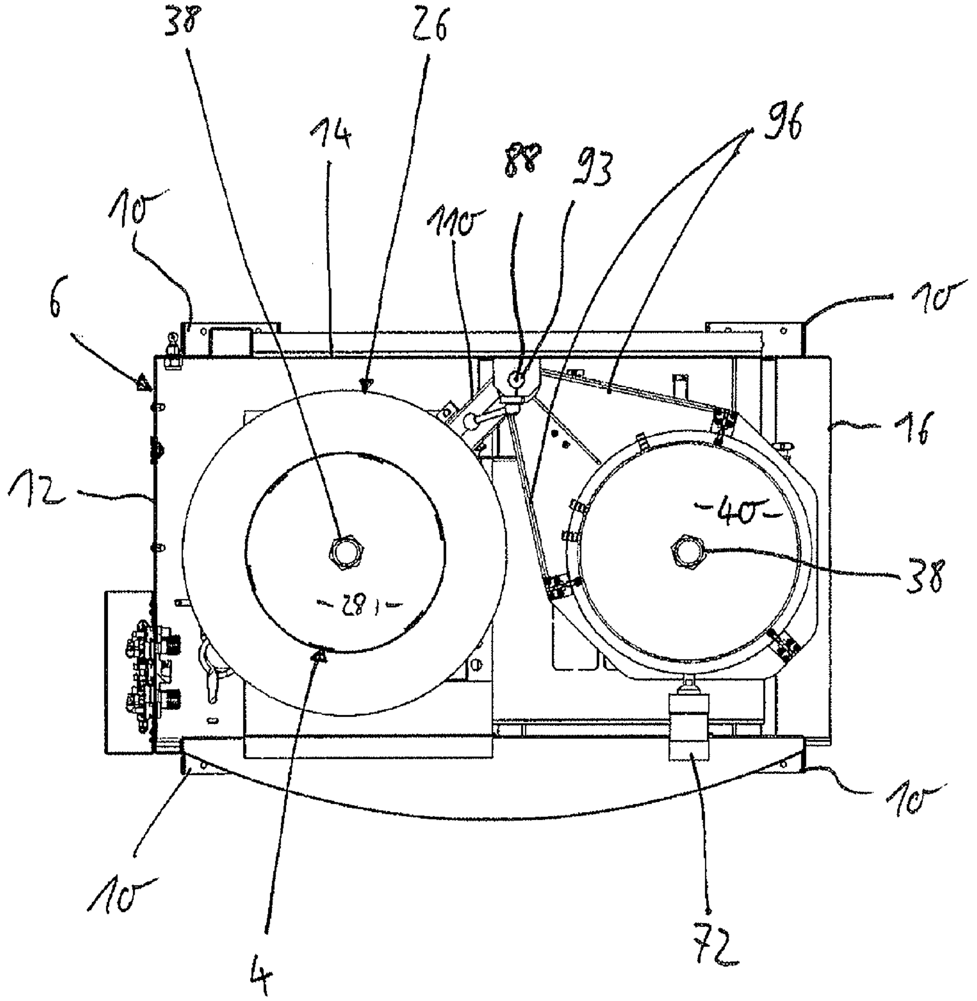
Figure 8:
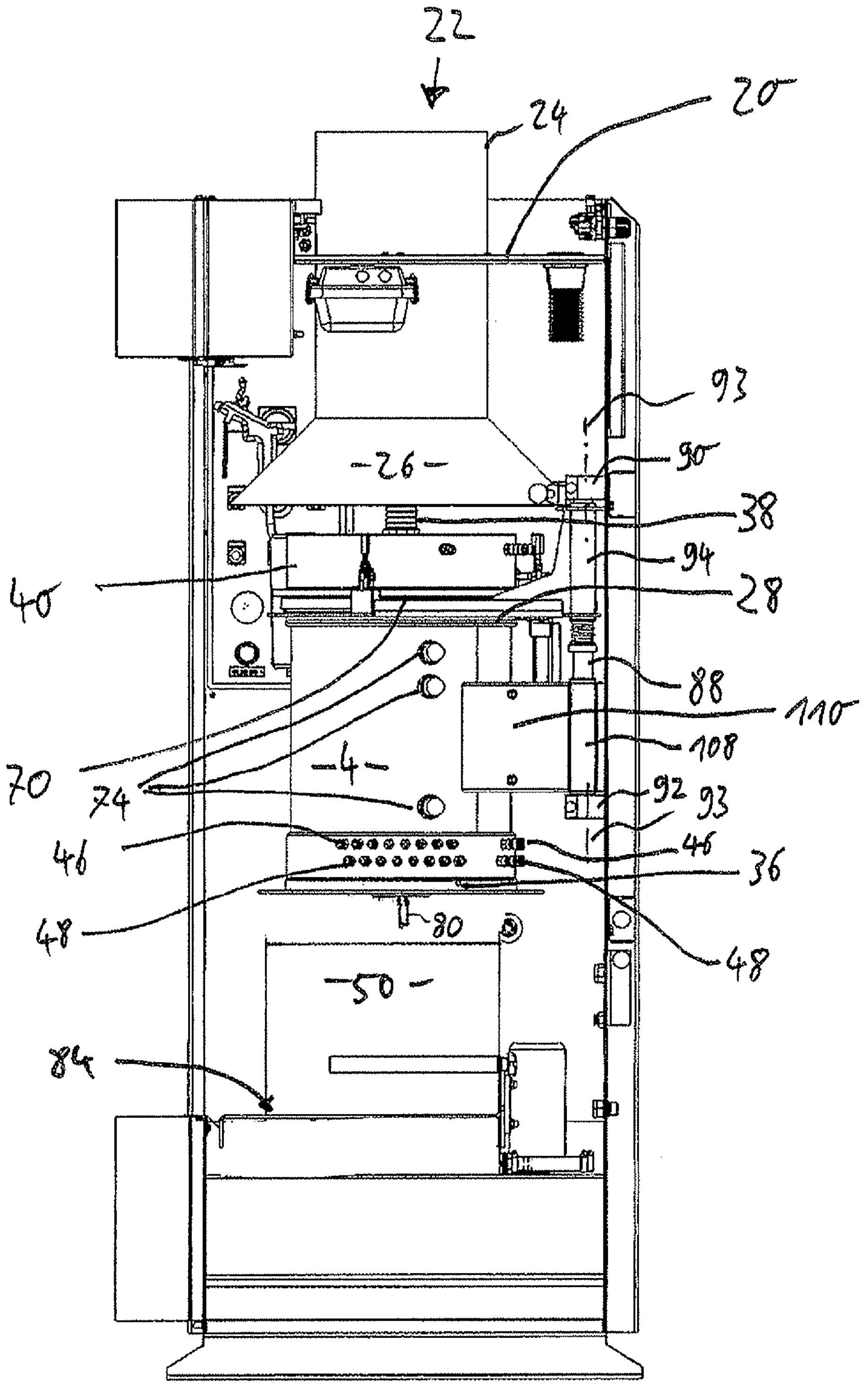
Figure 11:
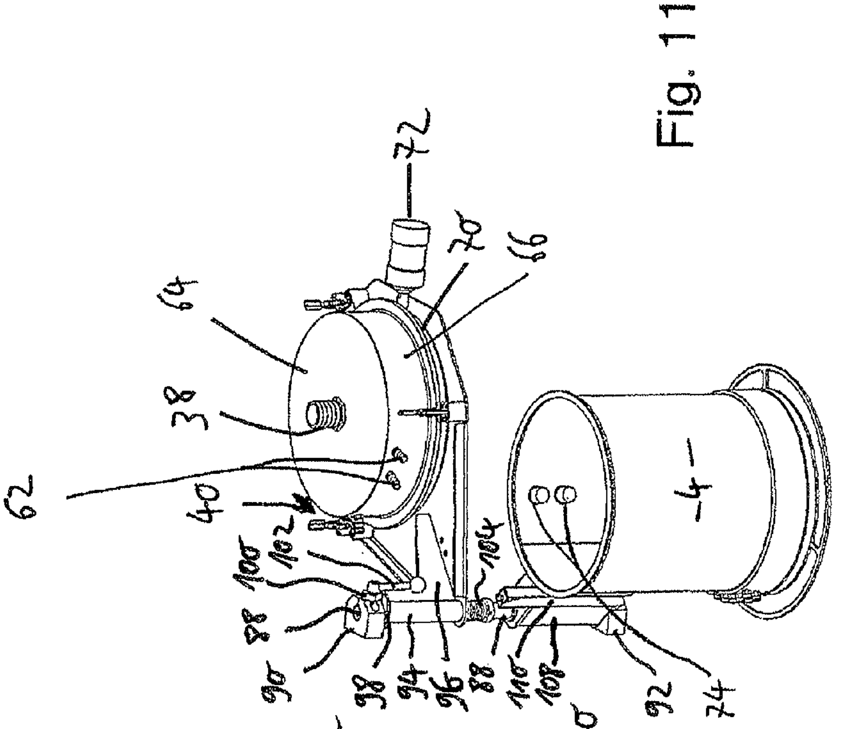
Figure 9:
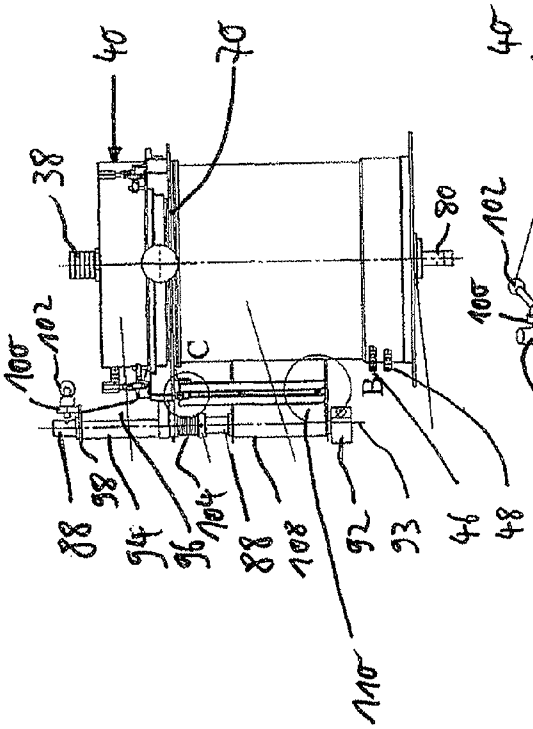
Figure 10:
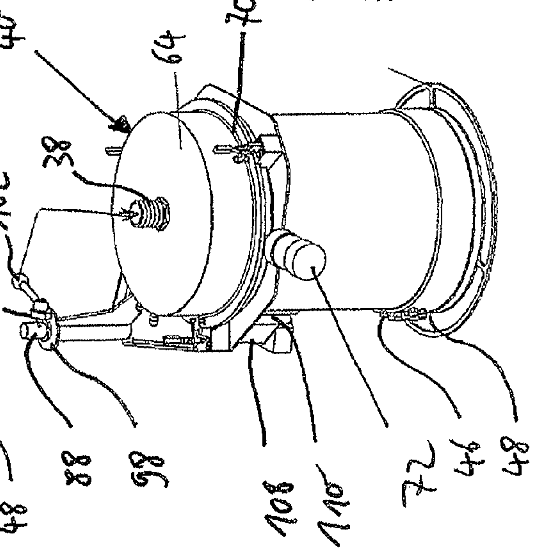

FIG. 4 the powder supply system according to FIG. 1 with a powder container (box) placed on a powder container base FIG. 5 the powder supply system in a perspective view FIG. 6 the powder supply system shown in FIG. 5 in a side view;

FIG. 7 the powder supply system in a top view in the purging or emptying position FIG. 8 the powder supply system in another side view in the purging or emptying position FIG. 9 a powder supply hopper of a powder supply system shown in the previous figures in a side view FIG. 10 a powder supply hopper of a powder supply system shown in the previous figures in a perspective view with a lid in a closed position FIG. 11 a powder supply hopper of a powder supply system shown in the previous figures in a perspective view with a lid in an open position.

Referring to the figures, in particular FIG. 1, a powder supply system 2 or powder feed centre 2 includes a powder supply hopper 4 and a support structure 6. The hopper 4 is movably mounted to the support structure 6, in particular pivotally mounted to the support structure 6. As can also be seen from FIGS. 3 to 8, the support structure 6 is of a type having frame elements such as metal profiles and panels such as sheet metal panels attached to the profiles which form a frame. The support structure 6 comprises a bottom base portion 8 having foot elements 10 on which the feed centre 2 stands, side wall sections including side walls 12, 14 and 16 as well as a hopper ceiling section 18, which comprises an upper plate or sheet 20 which is essentially in a horizontal orientation and mounted to the side walls 12, 14, 16 and/or profiles of the frame.

A powder suction device 22 or powder extraction device 22 is mounted to the support structure 6. The powder suction device 22 is mounted to the ceiling section 18 of the support structure 6. The powder suction device 22 comprises a pipe section 24 which can be formed of a cylindrical tube, which is attached to the sheet 20 of the sealing section 18. The powder suction device 22 further comprises a collector hood 26 which extends outwardly and has a conical wall. The internal cross-section of the collector hood 26 enlarges downwardly in a direction towards the hopper 4. In the emptying or purging position of the hopper 4 shown in FIGS. 1 through 8, the collector hood 26 is positioned above the hopper 4, in particular a top opening 28 of the hopper 4. The collector hood 86 and the pipe section 24 are connected to a filter device 30 shown in FIG. 1. Pipe section 24 is connected to the filter device 30 by means of a line 32, schematically illustrated in FIG. 1. The filter device 30 is connected to a vacuum source (not shown) such as vacuum pump or ventilator, so that a pneumatic transport of powder which flows out of the hopper 4 takes place through line 32 into filter elements of the filter device 30. Powder which is collected in the filter elements can be taken off the filter device 30 by means of outlets 34.

The powder supply system 2 further comprises a powder fluidizing device for fluidizing powder within the hopper 4. The powder fluidizing device is not shown in detail. It comprises a pressure gas source and at least one pressure gas line which is connected to an inlet port 36 shown in FIG. 8, through which pressurized gas, in particular air flows into the hopper 4. The pressurized gas flows into a fluidizing plenum formed between the bottom 78 of hopper 4 and a porous fluidizing plate positioned above bottom 78. The gas is distributed through the fluidizing plate into the hopper 4 and flows upwardly therein, so that powder which has been supplied into the hopper is fluidized. During the operation, the gas can flow out through the outlet opening 28 of the hopper 4 and out of the hopper 4 through an outlet port 38 or air vent 38. Air vent 38 is attached to a lid 40 which is adapted to close the upper or top opening 38 of the hopper 4. Air flowing out of the air vent 38 is sucked into the collector hood 28 of the powder suction device 22.

As is shown schematically in FIG. 2, the powder supply system 2 can be connected to at least on powder pump 42 for conveying or pumping powder from the powder supply hopper 4 to a spray device 44. To this end, the hopper comprises a plurality of openings in the wall of the hopper 4. As is shown in FIGS. 2 to 8, a plurality of outlet openings are positioned at a lower bottom section of the hopper 4. Each opening is connected to a port 46, 48. Ports 46 are positioned in one line along the periphery of the hopper 4, and ports 48 are positioned along a second line around the periphery of the hopper 4 below the first ports 46. Each port 46, 48 can be connected by means of a line 50 shown in FIG. 2 to an inlet port 52 of the pump 42. Pump 42 is shown in European Patent No. 1,689,531. Line 50 can be a hose or other connection for pneumatic transport of powder. An outlet port 54 of the pump 52 is connected by means of a line 56 such as a powder hose to a spray device 44. The spray device 44 may be a powder spray gun which can be operated manually or another spray device which may be attached to a powder spray booth or other powder coating installation. The powder pump 42 further has two pressure gas inlet ports 58 for operating the pump 42. Through the inlet ports 58, pressurized gas can be pressed into the pumps 42 and through lines 50, 56, in order to purge lines 50, 56 and the spray device 44 and the hopper 4. The purging operation is described in more detail.

Referring to FIG. 3, a powder transfer pump 44 is mounted to the support structure 6, in particular mounted to the back side wall 14 of the support structure 6. Pump 44 is shown in European Patent No. 1,689,531. Transfer pump 44 comprises an inlet port 46 which is connected to line 49 such as a hose so that powder can be pumped from the powder container 50 through line 49 into the pump 44. To this end, a powder container 50 is placed on the powder container vibration table 52 (see FIGS. 1, 3, 4, 5). The vibration table 52 comprises a plate 54 onto which the container 50 can be placed. The plate 54 can be vibrated by means of a vibration device (not shown in detail). Two horizontal arms 56 mounted to a sheet 58 fix the container 50 on the table 52. Table 52 is positioned at the lower section 8 of the support structure 6.

Powder transfer pump 44 has an outlet port 48 which is connected with a powder supply line 60 (FIG. 3) which is connected to a virgin powder inlet port 62 of the hopper 4. Additional pumps 44 each having an outlet port 48 may be provided and connected to additional supply lines 60 which are connected to further inlet ports 62 of the hopper 4. In the shown embodiment, the inlet ports 62 or a plurality of inlet ports 62 is/are attached to the lid 40 of the hopper 4, such that powder flows into the interior of the lid 40. Lid 40 comprises a housing which is formed by a cylindrical top wall 64 (see FIG. 2) and a circular side wall 66. Air vent 38 is connected to the top wall 64. Inlet port 62 is connected to the wall 66 which has the shape of the cylindrical pipe section.

Within the lid, a sieve 70 or screen 70 is positioned within the housing. The sieve 70 is positioned at a lower section of the housing of the lid 40. Fresh or virgin powder entering the lid 40 through ports 42 will flow downwardly towards the sieve 70. The sieve 70 results in an even powder particle distribution within the hopper 4. To place the sieve 70 within the housing, suitable attachment means are provided within the lid 40 such as fastening rings or screws or protrusions which are connected to the sheet 66 and extend inwardly.

A vibration device 72 (see FIG. 2, 10 or 11) is attached to the housing of the lid 14. Vibration device 72 comprises an electrical motor and coupling adapted so that the lid 40 vibrates so that powder within the lid 40 can be vibrated off the internal walls of the housing and the sieve 70.

The powder supply hopper 4 further comprises a plurality of level sensors 74 (see FIG. 2) for sensing the level of powder or the amount of powder within the hopper 4. Furthermore, the hopper 4 comprises an opening 76 (see FIG. 2) at a floor or base wall 78 of the hopper 4. An outlet port 80 including a valve 82 illustrated schematically is connected to the opening 76. When the valve 82 is in the open position, powder can flow out of the hopper 4 for emptying the hopper. In this case, hopper 4 is positioned above container 50 during the emptying of the hopper 4. Container 50 is placed on a powder container base 84 (see FIGS. 1 and 3 to 8). The base 84 is positioned at the bottom section 8 of the support structure 6. Base 84 comprises a plate 86 having a top surface onto which the container 40 can be placed. Plate 86 is attached to the frame and/or the walls 12, 14, 16 of the support structure 6. As can be seen from the FIGS. 3 to 8, the base 84 is positioned essentially below powder suction device 22, in particular the collector hood 26 of the powder suction device 22.

Hopper 4 and/or lid 40 of hopper 4 are moveably, more specifically pivotally mounted with respect to the support structure 6. With reference to FIGS. 2 to 11, the mechanism for pivotally attaching the hopper 4 and the lid 40 to the support structure 6 is described. Hopper 4 and lid 40 are independently moveable, more specifically independently pivotably mounted to the support structure 6.

A shaft 88 (See FIG. 8) which has a substantially vertical orientation is attached to the support structure 6, in particular the back wall 14 of the support structure 6 by means of an upper fastener 90 and a lower fastener 92. The lid 40 is pivotably mounted to the shaft 88 by means of a sleeve 94 in the form of a pipe section. Sleeve 94 surrounds shaft 88 in a pivotable manner and can also be moved upwardly and downwardly with respect to the longitudinal vertical axis of shaft 88. Attached to sleeve 94 is a lid support arm 96 to which the lid 40, in particular the housing of the lid is connected. For example, support arm 96 and circular sheet 66 can be welded or bolted together. At the upper end of sleeve 94, a ring shaped stop 98 is attached. Stop 98 limits the upward movement of sleeve 94 and the lid 40. Further, stop 98 connected to sleeve 94 cooperates with an eccentric element 100 (see FIG. 2). Eccentric element 100 is rotatably mounted to fastener 90 such that when it is rotated about a horizontal axis, the eccentric element 100 cooperates with the ring shaped stop 98 such that the ring shaped stop 98 and sleeve 94 and support arm 96 and lid 40 connected to support arm 96 are moved upwardly or downwardly, depending on the direction of rotation of the eccentric element 100, so that the lid 40 can be moved upwardly or downwardly. The eccentric element 100 is connected to a handle 102 to be rotated manually. A compression spring 104 is positioned around shaft 94 and is in contact with a protrusion 106 formed up the shaft 94. With its upper end, the spring 104 is in contact and urged towards the support arm 96 so that the lid 40 is urged upwardly be means of a force of a spring 104. By rotating handle 102 together with the eccentric element 100, the sleeve 94 and the support arm 96 can be pressed downwardly together with the lid 40 so that the lid 40, when positioned above the top opening 28 of hopper 4 is closed by means of the lid 40. To this end, the peripheral edge of the housing of the lid 40 comes into contact with the upper edge of the hopper 4. Furthermore, a gasket or seal element can be provided between lid 40 and hopper 4 so as to seal the hopper when the lid 40 is in the closed position. By rotating the handle 102 into the opposite direction, the sleeve 94 is moved upwardly be means of the spring 104 so that the lid 40 is pressed upwardly so that it comes out of contact from the upper edge of the hopper 4 so that the opening 28 is opened. In this position, the lid 40 can be pivoted away from the hopper 4. The axis of pivot 93 is defined by the longitudinal axis 93 of the shaft 88 (FIG. 9). The closed position of the lid 40 with respect to hopper 4 is shown in FIGS. 4, 8, 9 and 10. The open position where the lid 40 is pivoted away form the opening 28 of the hopper 4 is shown in FIGS. 5, 6 and 11.

The hopper 4 is also pivotally mounted to the support structure 4. Similar like the lid 40, a sleeve element 108 is rotatably mounted around shaft 98. Sleeve element 108 is connected to a support arm 110. Support arm 110 comprises two sheets or plates which connect the hopper 4 with the sleeve portion 108 which surrounds shaft 88. Thus, the hopper 4 is pivotally mounted at the support structure 6. The pivot axis 93 is defined by the longitudinal axis 93 of the shaft 88. The hopper 4 can be pivoted from a position below the powder suction device 22 and above the container base 84 (e.g. FIGS. 3, 4, 5) into different positions, e.g. a position substantially above the vibration table 52. When the lid 40 is in the closed position and pressed downwardly by means of the eccentric element 100 downwardly onto the hopper 4, the hopper 4 and lid 40 could be moved together in a pivoting movement around shaft 88.

It is clear, that the hopper 4 can be pivoted between a position above base 84 and below suction device 22 shown in FIG. 5 to a position substantially above vibration table 52.

A pivoting and lifting mechanism 97 for pivoting and lifting the lid 40 is formed by the before mentioned components including shaft 88, fasteners 90, 92, sleeve 94, support arm 96 and spring 104. Mechanism 97 is adapted to allow the lid 40 to be pivoted between different positions and to lift or lower the lid 40 along longitudinal axis 93 of the shaft 88 so as to open and close the top opening 28 of hopper 4.

The method according to the invention and the operation of the powder supply system is described in the following:

A container 50 including powder of a first colour is placed at the powder supply system 2 on the vibration table 52 (FIG. 3). Line 49 is positioned within container 50. Hopper 4 is closed. To this end, lid 40 is pivoted above hopper 4. Handle 102 is moved so that sleeve 94 and lid 40 are lowered so that the top opening 28 of the hopper 4 is closed by the lid 40. Preferably, hopper 4 and lid 40 are pivoted into the position shown in FIG. 3 in which hopper 4 is positioned above base 84 and below powder extraction and suction device 22. Powder transfer pump 44 is switched on so that powder is pumped from container 50 through lines 49 and 46 and inlet ports 62 into the interior of hopper 4. When the virgin powder is flowing into the lid 40, it passes sieve 70 so that the powder is distributed and an even powder particle distribution is achieved within hopper 4. The powder in hopper 4 is fluidized by means of the powder fluidizing device. Pressurized air flows into the hopper 4 through opening 36.

The hopper 4 of the powder feed centre is now in the operating condition. When one or more powder pumps 42 (FIG. 2) are switched on, powder is conveyed from hopper 4 through lines 50 and pump 42 and line 56 to one or more spray devices 44. An object can be powder coated.

In case of a change of colour of the powder, an emptying and purging operation is carried out. Hopper 4 would be positioned above a container 50 for powder having the first colour. Preferably, container 50 is positioned on base 84 and the hopper 4 is pivoted around the pivot axis 93 above container 50, so that the outlet opening 76 and outlet port 80 are positioned above container 50 (see e.g. FIG. 4, 5). Dump valve 82 is opened so that powder flows out of port 80 into the container 50. The fluidizing can continue during this phase. Most of the powder flows out of hopper 4. After this phase, the dump valve 82 is closed.

Subsequently, the lid 40 would be opened and pivoted away from the top opening 28 of hopper 4 (FIG. 5 or 6). To this end, the pivoting and lifting mechanism 97 would be activated and the lid 40 be opened. The hopper 4 would then be brought in the purging position shown in FIG. 5 or 6, so that the hopper 4 is positioned below the extraction or suction device 22 and preferably above base 84. Powder suction device 22 sucks air and residual powder towards filter device 30 (FIG. 1). Compressed air as a purged gas is pumped into the hopper 4. To this end, the one or more pumps 42 are activated in a reverse mode so that compressed air flows out of port 54 through line 50 toward port 46 and into an opening into the hopper 4. Compressed air is pumped by means of pump 42 through line 56 toward spray device 44 so that residual powder is pumped or purged out of pump 42 and lines 50 and 56. Residual powder which is in hopper 4 is flowing upwardly. If, in accordance with a preferred embodiment, the inlet openings at ports 46, 48 are in a tangential orientation, a vortex flow or similar flow is generated within hopper 4. Residual powder particles flow out of the hopper 4 through top opening 28. Powder particle are sucked by means of the powder suction device 22 and collected within the collector hood 26. The powder flows through line 32 to filter device 30. Further, the lid 40 and the sieve 70 can be cleaned. This may be achieved by means of manual operation. The operator brings the lid in the open position and pivots the lid 40 close to the collector hood 26. The sieve 70 is taken out of the housing of the lid 40. By means of an air nozzle which is connected to a pressurized gas source the sieve 70 and the lid is cleaned. The vibration device 72 would be activated. Residual powder is extracted into the collector hood 26 of the extraction device 22.

After the system 2 is cleaned, a container 2 including a second powder coating material having a different colour would be placed next to or on the system 2, in particular on the vibration device 52. The lid 40 would be pivoted over the opening 28 of hopper 4. The hopper would be closed. Line 49 would be placed within the new container 50 and the hopper 4 be filed by means of a transfer pump 44, as described above.

The powder supply system 2 having an easy clean hopper 4 in accordance with the invention allows for a quick colour change, so that the system is cleaned substantially automatically.

Some of its novel combinations are:

Powder supply system for supplying powder to a powder spray device comprising
a powder supply hopper;
a powder fluidizing device for fluidizing powder positioned in the powder supply hopper;
a powder pump for conveying powder from the powder supply hopper to the spray device;
characterized in that the powder supply hopper is pivotally mounted to a support structure.

Powder supply system for supplying powder to a powder spray device, comprising
a powder supply hopper;
a powder fluidizing device for fluidizing powder positioned in the powder supply hopper;
a powder pump for conveying powder from the powder supply hopper to the spray device;
characterized in that powder supply hopper comprises a lid which is movably mounted to a support structure.

Powder supply system for supplying powder to a powder spray device, comprising
a powder supply hopper;
a powder fluidizing device for fluidizing powder positioned in the powder supply hopper;
a powder pump for conveying powder from the powder supply hopper to the spray device;
a support structure comprising a powder container base for placing a powder container;
characterized in that powder supply hopper is positioned substantially above the powder container base such that powder from the powder supply hopper can be conveyed downwardly into a powder container placed on the powder container base.

Powder supply system for supplying powder to a powder spray device, comprising
a powder supply hopper;
a powder fluidizing device for fluidizing powder positioned in the powder supply hopper;
a powder pump for conveying powder from the powder supply hopper to the spray device;
a support structure;
characterized in that a powder suction device is mounted to the support structure and is adapted to remove residual powder which flows out of the powder supply hopper.

Powder supply system for supplying powder to a powder spray device comprising
a powder supply hopper having an opening and a lid for closing the top opening;
a powder fluidizing device for fluidizing powder positioned in the powder supply hopper;
a powder pump for conveying powder from the powder supply hopper to the spray device;
characterized in that a sieve is mounted to the lid.

A method for colour change in a powder supply system, of the type having a powder supply hopper with a top opening and lid, a powder fluidizing device, a powder pump for conveying powder from the powder supply hopper to a spray device and a support structure for supporting the power supply hopper and/or the powder fluidizing device and/or a powder container base for placing a powder container,
placing a first powder container containing powder of a first colour on the supply system,
pumping or filling powder from the first powder container into the powder supply hopper,
fluidizing the powder in the powder supply hopper by means of a powder fluidizing device,
conveying powder from the powder supply hopper to at least one spray device by means of the powder pump,
stopping the conveying operation,
positioning the power supply hopper above the powder container positioned on the powder container base, emptying powder from the hopper into the powder container,
opening a lid of the powder supply hopper to open a top opening,
pumping purge gas into the powder supply hopper through at least one opening by means of a pump,
purging the hopper by means of the purged gas so that residual powder flows out of the top opening of the powder supply hopper,
extracting powder flowing out of the top opening by means of a powder suction device.

The invention claimed is:

1. Powder supply system for supplying powder to a powder spray device, comprising a support structure including at least one support arm;

a powder supply hopper including a body attached to the at least one support arm and a lid independently attached to the at least one support arm;

a powder fluidizing device for fluidizing powder positioned in the powder supply hopper;

a powder pump for conveying powder from the powder supply hopper to the spray device; and at least one conduit for connecting to the pump and discharging to the spray device;

characterized in that the lid is pivotably mounted to the support structure, so that the lid is movable between a first open position and a second closed position, in which the lid closes a top opening of the powder supply hopper;

wherein the lid is pivotably mounted to the support structure by means of a pivoting and lifting mechanism which is adapted to allow the lid to be pivoted from the first open position into the second closed position and lower the lid towards the powder supply hopper, to close the top opening, and to lift the lid upwardly from the powder supply hopper, to open the top opening.

2. System of claim 1, characterized in that the pivot axis for the lid is in a substantially vertical orientation and in that the powder supply hopper is attached to at least one support arm and in that the lid is attached to at least one support arm.

3. System of claim 1, characterized in that the powder supply hopper and the lid are independently movable.

4. System of claim 1, wherein the lid pivots about a pivot axis having a substantially vertical orientation.

* * * * *